Aug. 4, 1959
K. E. HUMBERT, JR
2,897,966
FILTER UNIT
Filed May 24, 1955
3 Sheets-Sheet 1
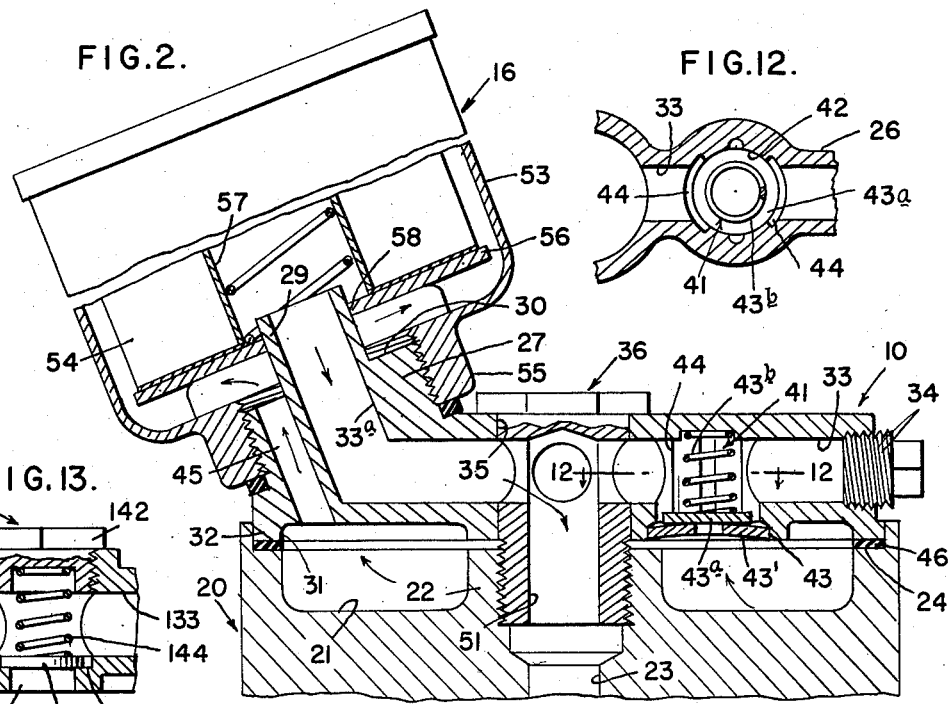
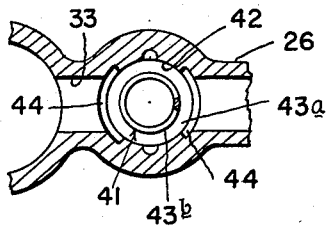
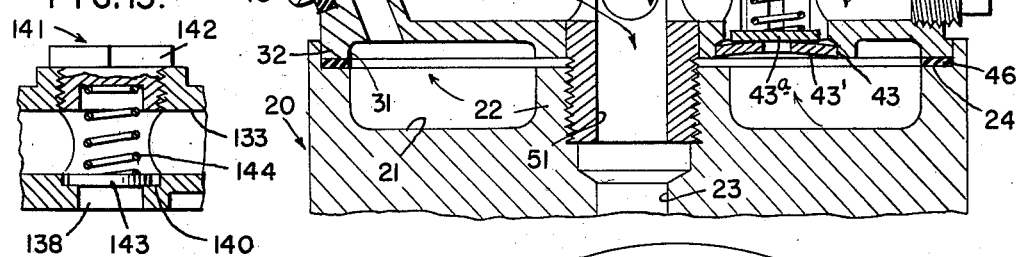
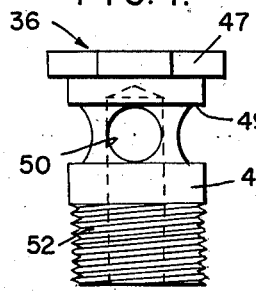
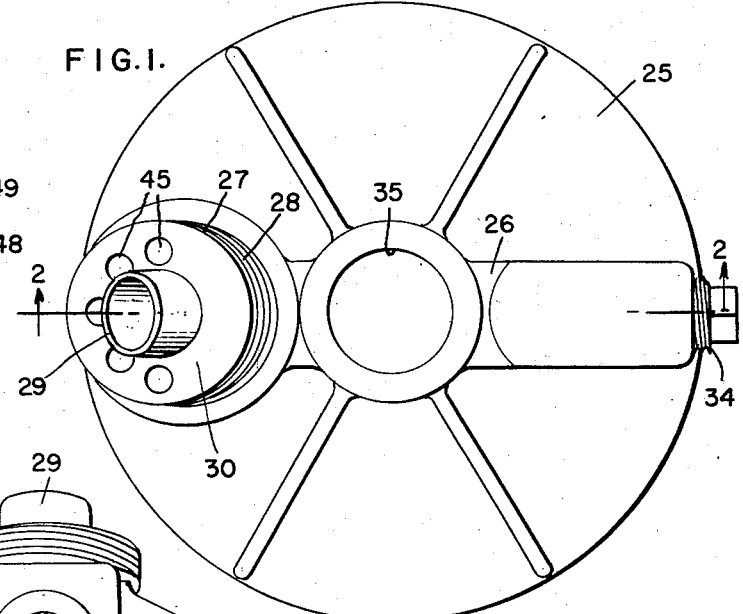
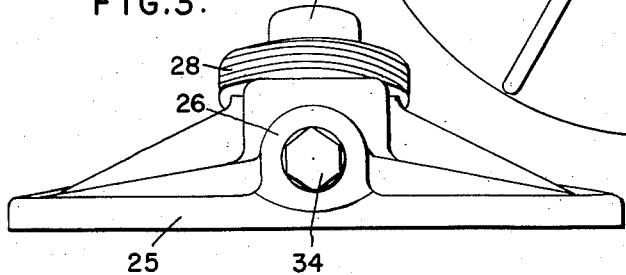
INVENTOR.
Kingsley E. Humbert, Jr.
BY
Shoemaker & Mattare
ATTYS

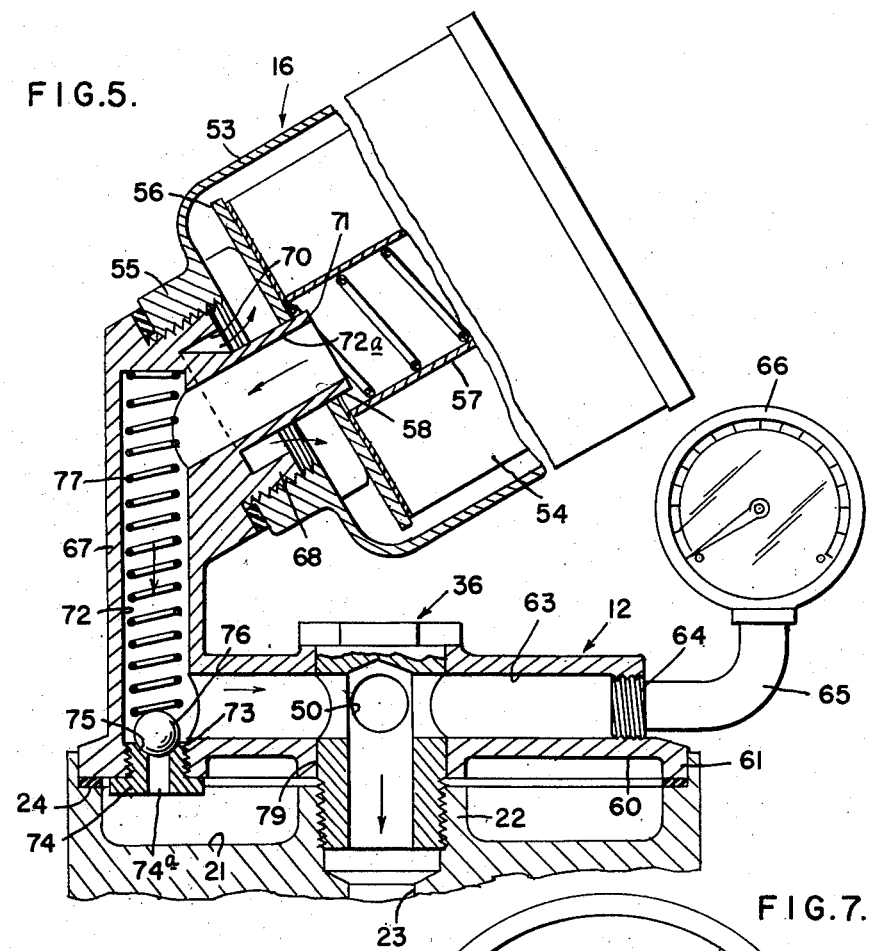
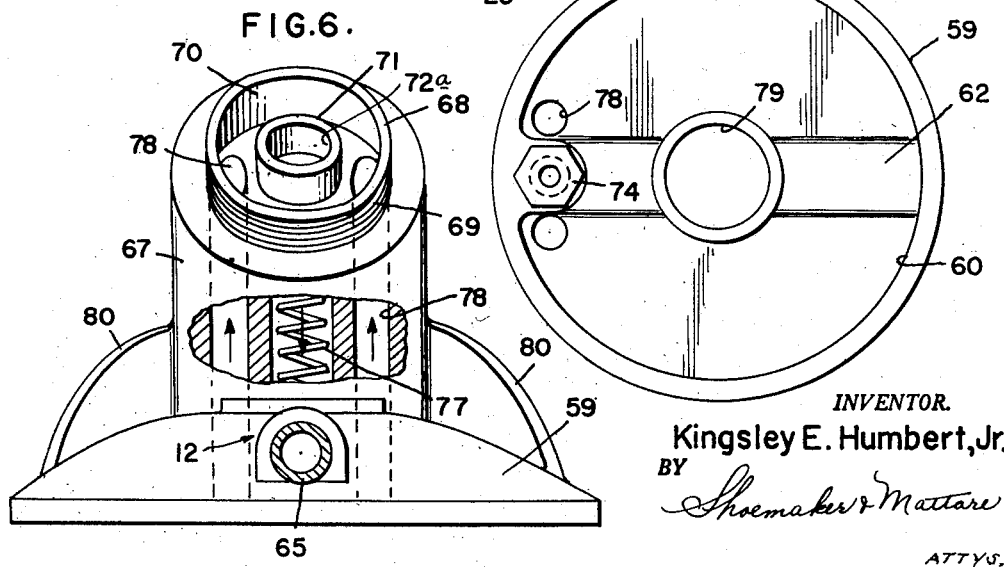

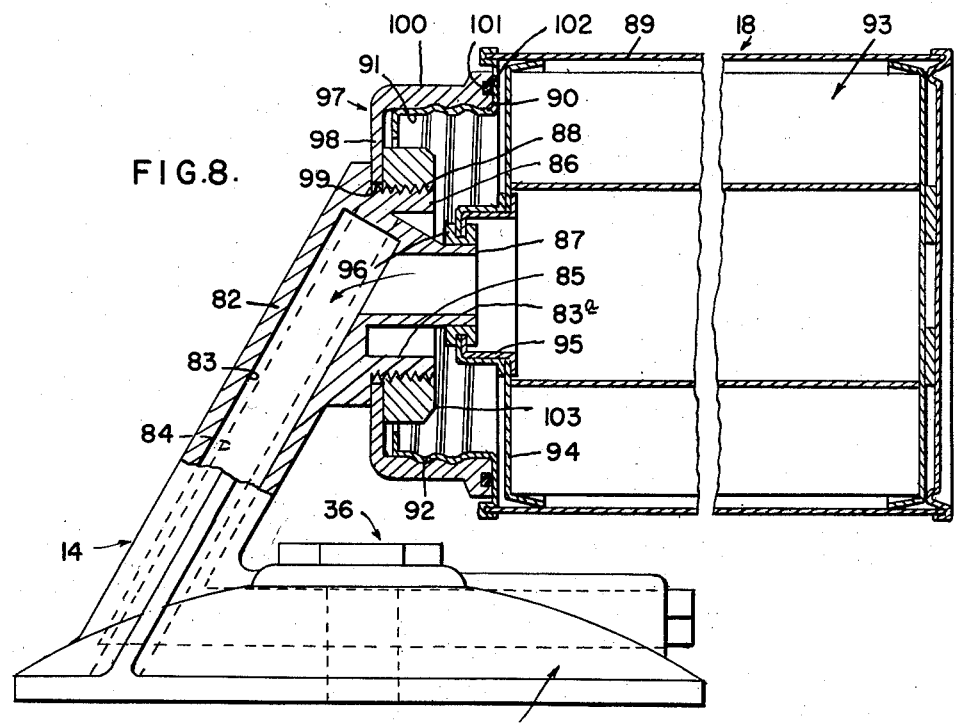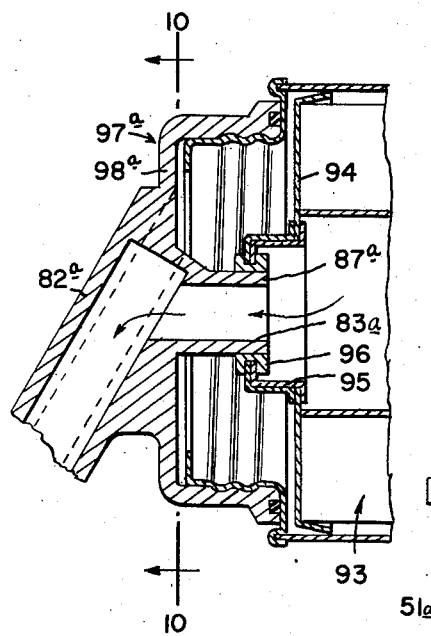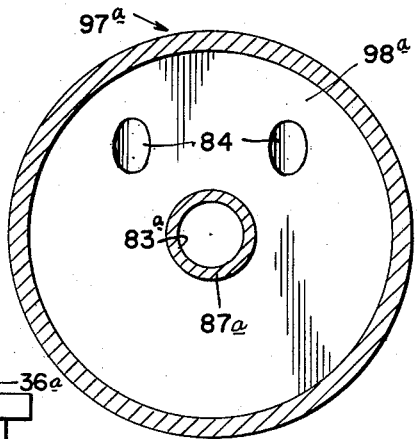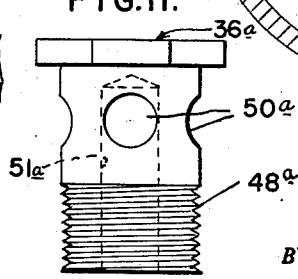

United States Patent Office 2,897,966
Patented Aug. 4, 1959

2,897,966
FILTER UNIT

Kingsley E. Humbert, Jr., Gastonia, N.C., assignor to Wix Corporation, Gastonia, N.C., a corporation of North Carolina Application May 24, 1955, Serial No. 510,678

15 Claims. (Cl. 210—168)

This invention relates generally to the class of lubrication and is directed particularly to mounting means for filter units and more particularly mountings for filters of the screw neck type used in connection with the oiling systems of automotive engines.

In a number of applications of filter units in automotive use today the unit for filtering the oil is of the full flow design and is mounted directly to the engine or coupled to a special form of base quite closely to the engine block. In these applications no external oil lines are employed. Certain very distinct disadvantages are associated with this type of mounting in a number of cases in that the filter housing lies in a position which puts it in such close proximity to certain members of the vehicle's frame, body, steering mechanism, etc., that removal of the filter housing and replacement of the filter element is most difficult and time consuming.

In addition to the difficulty of reaching the filter in present installations, in order to remove the same, provision must be made for catching oil drippings from the recess in the engine block over which the filter unit is secured since, in certain mountings, the filter shell has an open end which receives oil from such recess and when the unit is removed some residual oil escapes.

A particular object of the present invention in view of the foregoing, is to provide a new mounting unit or base for use in association with a full flow lubrication system, for a filter unit, whereby the unit may be placed or set in operative position in such a manner as to enable a mechanic to reach and remove the same and install a new filter with a minimum of difficulty.

Another object of the invention is to provide a new mounting means for a filter unit of the type having a screw threaded neck portion, wherein the attachment or installation and removal of the unit involves the simple operation of screwing the filter onto a threaded part of the base or unscrewing it therefrom, whereby, in the operation of applying or mounting the filter, the connections between inflow and outflow ports are automatically established.

Still another object of the invention is to provide a new filter unit mounting which is designed for coaction with existing structure of the engine block whereby residual oil in the oil recess over which the mounting means is positioned is prevented from escaping when the filter unit is taken off so that the job of replacing the unit can be performed cleanly and eliminates the necessity of using a drip-receiving receptacle.

A still further object of the invention is to provide in connection with those existing automotive structures where the filter is attached to the side of the engine block over an oil receiving recess, a new mounting means which permits disposition of the filter in either a parallel relation with the adjacent side of the block or at such an angular relation therewith that the installation and/or removal of the filter unit will not be hindered by adjacent elements of the vehicle structure.

Another object of the invention is to provide a new mounting base or pad for a filter in a full flow lubrication system having incorporated in the structure thereof a by-pass means whereby circulation of the lubricating oil will not be shut off in the event of blockage in the attached filter unit.

Yet another object of the invention is to provide a new mounting base or pad which is designed or constructed in a novel manner for shunting a part or all of the lubricating oil past the filter unit in the event the latter becomes blocked or which may be modified so that the conventional full flow system may be maintained.

It is also an object of the present invention to provide a new mounting base of the above described character wherein, in addition to embodying means to permit the by-passing of the attached filter unit in the event of blockage therein, it is designed so that a pressure gauge may be connected therewith to indicate pressure of the oil passing through the mounting base.

The foregoing and other objects are attained by the provision of a plate body of proper dimensions to fit over the oil receiving recess which is found in the block of the engine in certain automotive vehicles and which recess is at the present time connected directly with the removable filter shell. This plate body has formed integral therewith a mounting stud with which is connected the filter unit, the stud being screw threaded whereby a filter unit having a screw type neck may be connected therewith. The plate body is provided with a radial bore which leads to a passage in the mounting stud and which intersects a transverse opening through which a tubular bolt extends for threaded connection with the outer end of the oil return port in the engine block. In addition to this passage which forms the return flow from the attached unit, the mounting stud is provided with one or more outflow passages which open through the underside of the plate body into the oil receiving recess which is formed in the side of the engine block and through which the oil passes into the attached filter.

The plate body is provided with a by-pass passage or port leading from the engine block recess into the radial bore which is normally closed by a pressure actuated valve element and by this means in the event that the filter mounted upon the stud becomes blocked, oil will pass from the recess directly back into the return port, by-passing the attached filter.

The invention will be best understood from a consideration of the following detail description taken in connection with the accompanying drawings forming a part of the specification, with the understanding, however, that minor changes and modifications may be made in the structure so long as such changes or modifications mark no material departure from the salient features of the invention as expressed in the appended claims.

In the drawings:

Fig. 1 is a view in top plan of one embodiment of a mounting means for a screw neck type filter, constructed in accordance with the present invention;

Fig. 2 is a transverse sectional view of the mounting means taken substantially on the line 2—2 of Fig. 1 and showing the same mounted on an engine block and also illustrating the application or attachment thereto of one form of filter unit of the screw neck type;

Fig. 3 is a view in side elevation of the mounting means looking at the same from the side opposite from the filter supporting stud;

Fig. 4 is a view in side elevation of a securing bolt by which the mounting means is secured in position on the engine block;

Fig. 5 is a transverse sectional view corresponding to Fig. 2, through a second embodiment of the mounting means wherein the stud to which the screw neck type filter is coupled is carried by an upstanding post and showing one type of filter applied thereto;

Fig. 6 is a view in side elevation of the mounting device shown in Fig. 5 looking at the same from the side opposite from the mounting stud and with a portion of the post broken away to show the flow passages therethrough;

Fig. 7 is a view in bottom plan of the second embodiment illustrated in Figs. 5 and 6;

Fig. 8 illustrates a third embodiment of the invention wherein an adapter is provided for securement to the threaded stud whereby a filter unit of the type having an externally threaded large diameter neck may be coupled to the supporting means and wherein also the filter unit may be supported in approximately parallel relation with the adjacent side of the engine body;

Fig. 9 illustrates a construction wherein the adapter shown in Fig. 8 is formed as an integral part of the post;

Fig. 10 is a sectional view taken substantially on the line 10—10 of Fig. 9;

Fig. 11 is a view in elevation of another attachment bolt construction;

Fig. 12 is a sectional view taken substantially on the line 12—12 of Fig. 2;

Fig. 13 is a detail view of a modified type of relief valve.

Referring now more particularly to the drawings, it will be seen that there are illustrated three embodiments of the filter mounting which are designated 10, 12 and 14. These embodiments are broadly of like construction but are designed to maintain the attached filter in different positions with respect to the engine body or engine block to which the base is secured.

The mounting units are also designed to have attached thereto filter units having different types of screw necks. In the first two embodiments designated 10 and 12 (see Figs. 2 and 5) the filter units designated 16 are of the type wherein the neck has an internal screw thread and which type of filter is disclosed and claimed in my copending application Serial No. 478,359. In the embodiment of the mounting means or mounting unit designated 14 (see Fig. 8) there is illustrated a screw neck type filter unit 18 wherein the neck is of larger diameter and has external screw threads, means being provided whereby a threaded cup may be secured to the mounting stud to receive the neck of this unit or such threaded cup may be formed as an integral part of the device as hereinafter particularly described.

Referring now to the first embodiment of the invention as illustrated in Figs. 1 to 4, the numeral 20 designates a portion of an engine block, which is of conventional construction and has therein the annular recess 21 in the center of which is the outstanding stud 22 which is screw threaded internally and through which leads the filtered oil return port 23.

In automotive vehicles of conventional construction, this oil receiving recess is formed on the side of the engine block and has fitted thereover an end of a filter shell which is secured in position by a bolt passing therethrough threaded at its inner end into the stud 22. Oil flows from the engine oil gallery into the recess 21 and from there passes into the filter to be returned, after being filtered, to the return flow passage 23.

The recess 21 has an encircling shoulder 24 upon which is mounted the presently used filter shell and which shoulder is utilized in the present invention for the attachment of the present filter mounting means.

In the first embodiment of the invention there is provided the circular plate 25 which is of the same diameter as the shoulder 24 encircling the oil receiving recess 21. This plate is substantially flat and has formed integral therewith on the outer side the diametrically extending heavy rib 26 one end of which joins an upwardly and outwardly extending circular stud 27 which is externally screw threaded as indicated at 28.

The stud 27 has the axially extending nipple 29 formed integral therewith, the outside diameter of which nipple is materially less than the diameter of the stud so that there is provided the flat shoulder 30 around the nipple.

The under face of the plate is preferably recessed as indicated at 31 so that the underside of the plate is defined by an encircling flange 32 which opposes the shoulder 24 of the engine body when the plate is placed in position over the recess 21.

Formed through the rib 26 is a radial bore 33 which at one end leads upwardly through the flow passage 33ª which passes axially through the stud and the nipple 29 and opens through the upper end of the nipple as shown.

The outer end of the bore 33, that is, the end remote from the stud 27, is internally screw threaded and may be closed by the threaded plug 34, here illustrated, or may have an instrument connected therewith such as a pressure gauge, as hereinafter described.

Formed through the radial center of the plate 25 is the opening 35 which opens through the top and bottom faces of the plate and intersects the bore 33. This opening is formed to receive the mounting bolt generally designated 36 and hereinafter more particularly described.

The numeral 41 generally designates a by-pass valve. This valve embodies a bore 42, which is formed either by casting or drilling, in the rib 26 from the underside and intersects the bore 33, as shown. The lower end of the valve bore 42 is enlarged to form the shouldered recess 43 and the wall of the bore 42 is cut away longitudinally at diametrically opposite sides in the areas through which the bore 33 opens to form the side channels 44.

Press fitted into and frictionally tightly secured in the recess 43 is a centrally apertured washer 43' and resting upon the top of this washer is a valve disc 43ª. The valve disc 43ª is yieldingly maintained on the seat formed by the edge of the opening in the washer 43' by a coil spring 43ᵇ.

Formed through the stud 27 are outflow passages 45 which parallel the passage 33ª as shown, and these outflow passages open through the inner side of the recessed portion 31 of the plate and at their outer ends they open through the shoulder 30 of the mounting stud.

As hereinbefore stated, the plate 25 positions over the oil receiving recess 21 in the engine block and the flange 32 has interposed between it and the engine block shoulder 24 a sealing gasket 46.

The plate is maintained in position over the recess 21 by the bolt 36. This bolt, as shown particularly in Fig. 4, comprises the headed outer end 47 and the shank portion 48. Adjacent to the head 47 the shank portion 48 has a channel 49 formed therearound, into which the radial ports 50 open, which ports communicate with the bore or passage 51 formed axially through the bolt and opening through the inner end thereof. The inner end portion of the bolt is screw threaded as indicated at 52 for threaded engagement in the stud 22 which is located in the center of the oil receiving recess 21. As is clearly shown, the bolt 36 extends through the central passage 35 of the plate and when it is drawn to position to secure the plate in place the circular recess 49 will lie in the plane of the bore 33 so that oil flowing through the bore 33 may enter the bore 51 of the bolt and pass in through the oil flow return passage 23.

The filter unit 16, here shown, is, as hereinfore stated, of the type disclosed in my copending application above identified. In this filter unit the shell 53 in which the filtering element 54 is housed, has a neck portion 55 which is internally screw threaded and is adapted, or may be adapted, to receive the threaded stud 27. When mounted on the stud as illustrated, the oil outflow passages will discharge into the shell 53 below the disc or plate 56 which forms a part of the filter element and flows laterally in the shell to the outer sides of the filter element to return through the central part 57 thereof. The disc 56 of the filter element is provided with a central aperture 58 which opens into the central passage 57 of the element and in this aperture the end of the nipple 29 extends, as shown. Thus the oil passing through the passages 45 will enter the shell as stated, and will be returned by way of the passage 33 to the center of the mounting plate and to the return flow passage 23 forming a part of the engine lubricating system.

In the construction shown and forming the first embodiment of the invention the stud 27 on which the filter unit is mounted is directed obliquely outwardly with respect to the axial center of the plate.

In the second embodiment of the invention, generally designated 12, the plate 59 is preferably formed with a convex top surface or wall as illustrated in Fig. 6, while the underside is provided with the circular recess 60 which is defined by the surrounding flange 61. This flange is of the proper diameter to seat upon the mounting shoulder 24, hereinbefore described. The numeral 62 designates a radial rib formed across the recessed under face of the plate and extending diametrically of the plate is a bore 63.

One end of the bore is screw threaded as indicated at 64 to receive a threaded plug, such as the plug 34 hereinbefore referred to, or a threaded end of a tube 65 connected with a pressure gauge 66, as shown in Fig. 5. This pressure gauge may also be used upon the first described embodiment or on the third embodiment of the invention hereafter described, if desired, or the end of the radial bore may be closed if the gauge is not to be used.

Formed integral with the plate 59 at the opposite end of the bore 63 is a post 67 which in this embodiment is substantially perpendicular to the plane of the plate and the upper end of the post carries the stud 68 which is externally threaded as shown at 69 and has formed therein the annular channel 70 which encircles the centrally positioned or axially extending nipple 71. This stud and nipple extend obliquely from the upper end of the post 67 across the axial center of the plate, as shown.

The post 67 has formed centrally therethrough the filtered oil return flow passage 72 which at its lower end joins the radial bore 63. At its upper end the passage 72 extends through the center of the nipple 71, as indicated at 72ª.

The underside of the plate is provided with a port 73 which aligns with the passage 72 and in this port is secured a valve seat element 74. This element is here illustrated as being threaded into the port, but is is also contemplated to secure it in place by a press fit or in any other suitable manner. The valve seat element has a central passage 74ª therethrough and the element at the upper end of this passage is shaped to form the ball seat 75 upon which is positioned the valve ball 76. This ball is yieldingly held in position by the coil spring 77 the upper end of which engages the upper or outer end of the passage 72, as shown.

In addition to the passage 72 which provides for the return flow of filtered oil from the filter unit 16 mounted on the stud 68, the post has formed therethrough the outflow passages 78. The lower ends of these passages open through the underside of the plate into the recess 60 while the outer ends of the passages open into the annular channel 70.

The center of the plate 59 has formed therethrough the bolt opening 79, corresponding to the opening 35 of the first embodiment and this opening receives the mounting bolt 36 hereinbefore described, the radial ports 50 of which align with the bore 63, as illustrated.

The numeral 80 designates lateral ribs formed integral with the plate and the opposite sides of the post 67 to give rigidity or support to the post.

In the third embodiment illustrated in Fig. 8, the plate which is generally designated 81 is shown as being of the same design or form as the plate 59. No details of the radial passage of this plate, corresponding to the passage 63, are shown as it is not believed that such illustration is required.

This third embodiment takes two forms which are illustrated in Figs. 8 and 9, and is designed to have coupled therewith a screw neck type filter wherein the neck is of large diameter and externally screw threaded. In addition this third embodiment is of a design whereby the filter when attached has its long axis disposed approximately parallel with the plane of the bottom face of the plate 81.

Numeral 82 designates the tubular post, corresponding to the post 67, and which has formed longitudinally therethrough a central bore 83 by which the oil is returned from the filter into the oil gallery of the engine to which the filter mounting means is attached. On opposite sides of the bore 83 are the outflow passages 84 corresponding to the passages 78. The outer end of the bore 83 joins the lateral bore extension 83ª and the outer ends of the side passages 84 open into the annular channel 85 formed in the externally threaded stud 86, the formation of which channel produces the nipple 87. The stud in this embodiment is externally threaded like the studs in the preceding embodiments, the threads here being designated 88.

It will be seen that the parts of the third embodiment are of the same design as those in the second embodiment but in this embodiment the post 82 is inclined toward the axial center of the plate 81 to the extent that the axis of the stud 86 is approximately parallel with the plate or with the under face thereof.

The filter unit 18, which is attached to the stud 86 by a special adapter cup about to be described, comprises the can or shell portion 89 which at one end carries the narrow wall 90 from which extends the neck 91 which is provided with the external threads 92. This neck provides a wide diameter opening leading into the shell 89 in which is housed the filter unit 93 which may be of any desired construction such, for example, as the construction shown in my copending application Serial No. 497,606 in which application also the herein disclosed externally threaded wide neck is shown.

The filter unit 93 is positioned against a centrally apertured end plate 94 in which is fitted the outwardly projecting thimble 95 carrying in its outer end the annular gasket 96 which is of proper diameter to receive or encircle the end of the nipple 87 when the filter unit is mounted in position and, as will be readily understood from the illustration, the filtered oil will be returned through the center of the unit 93 to the thimble 95 to enter the nipple 87 for return to the engine gallery.

To facilitate the application of this wide neck type filter to the mounting stud 86 there is provided the adapter cup 97. This cup as shown is of annular form, having the bottom 98 which has the central opening 99 therein of a diameter to receive the stud 86 and the circular side wall 100 the edge of which is of sufficient width to have the gasket channel 101 formed therein to receive a sealing ring or gasket 102. The cup 97 is initially mounted upon the stud and the bottom thereof comes to rest against the shoulder encircling the stud where it is secured by the nut 103 which is threaded on the stud as shown. The internal surface of the circular wall 100 is provided with suitable threads to receive the threads 92 on the neck 91. When the neck of the filter is threaded into the cup 97 the sealing ring 96 will slide over the projecting end of the nipple 87 and the annular wall portion 90 lying outside the threaded neck will come to rest against the sealing ring 102. It will be readily apparent from the foregoing that when the mounting means is secured in position against the engine wall over the oil recess 21 therein (see Figs. 2 and 5), the oil passing from this recess outwardly through the outflow passages 84 will enter the neck of the filter and be distributed outwardly around the filter element. From the outside of the element the oil will return through the element to the central portion and flow back through the bores 83 and 83ᵃ to the radial bore (not shown) in the plate 81, corresponding to the bore 63 of the second embodiment.

While the pressure relief or by-pass means has not been illustrated in this third embodiment, it will, of course, be understood that the bore 83 may have located therein a spring corresponding to the spring 77 and the lower end of the bore may open through a tubular nut having the passage thereof closed by a spring pressed ball corresponding to the ball 76.

Fig. 9 illustrates a construction wherein the cup 97 is formed as an integral or cast part of the upper end of the supporting post which is, in this figure, designated 82ᵃ. The cup for receiving the externally threaded wide neck of the filter is here designated 97ᵃ and, as shown, has the bottom 98ᵃ formed as a continuation or integral part of the end of the post 82ᵃ from which extends the nipple 87ᵃ. It will, of course, be readily understood that the other features which are not illustrated in this Fig. 9, such as the side passages for the outflow of the oil, corresponding to the passages 78 and 84, are the same as in the preceding structures and also since the cup 97ᵃ is cast or molded as a part of the post, the externally threaded stud such as that designated 86 is not required and the outflowing oil enters directly into the cup to pass through the filter neck into the filter shell.

Fig. 11 illustrates another form of bolt, designated 36ᵃ, which may be used in place of the bolt 36 which is shown particularly in Figs. 2, 4 and 5. In this second bolt form the shank portion which is designated 48ᵃ is not provided with the encircling channel 49 but has a multiplicity of radially extending ports 50ᵃ leading from the axial passage 51ᵃ which opens through the inner end of the bolt. With the bolt construction shown in Fig. 4 the provision of the encircling channel 49 permits rapid movement of the oil from the radial bore of the plate to the center of the bolt through a minimum number of radial ports 50 and in this second form of the bolt the number of radial ports may be increased so that the same rapid flow of oil may be obtained without reducing the diameter of the shank of the bolt.

As hereinbefore stated, in present methods of mounting a filter unit in certain automotive vehicles where the unit is secured over an oil recess in the side of the lower portion of the engine block, the unit extends laterally from the engine block substantially perpendicular to the same. Consequently the outer end of the filter unit is in relatively close proximity to adjacent parts of the engine or frame strtucture and considerable difficulty is experienced in removing the unit or placing a new unit in position.

By the provision of the new mounting means or adapter plates of the present invention, it will be seen that when any one of the plates herein shown is secured over the oil receiving recess 21 by means of the tubular mounting nuts 36 or 36ᵃ, the filter when attached to the studs forming an integral part of the plates will be disposed at an angle with respect to the adjacent side of the engine block. In the form of the invention constituting the first described embodiment the stud 27 extends obliquely outwardly with respect to the axial center of the plate and thus, if the plate is placed in position with the stud at the upper side of the recess 21, the attached filter will project upwardly and outwardly with respect to the adjacent side of the engine body and accordingly it can be easily reached by a mechanic and due to the fact that it is connected to the stud by screw threads, can be unscrewed and removed and a new filter installed. Also it will be apparent that by providing the plate body which covers the oil recess 21, when the filter unit is removed, any excess oil which may lie in the recess will be retained or prevented from running out.

In the second embodiment of the invention the post 67 positions the mounting stud so that the axis of the nipple is directed inwardly across the vertical axis line of the plate. With this construction when the plate 59 is secured in place, if the post is disposed at the lower side of the recess 21 it will be seen that the filter, when secured to the stud, will extend upwardly and outwardly with respect to the adjacent side of the engine block.

With the third embodiment, as has been previously stated, the filter, whether it be of the narrow or wide neck type, internally or externally screw threaded, will assume a horizontal position along the side of the engine body and may be arranged to extend forwardly or to extend rearwardly with respect to the adjacent engine structure. In either case, its position will be such that it can be easily reached and removed for replacement as may be necessary.

By the provision of the pressure relief valves such as are illustrated in Figs. 2 and 5, it will be readily obvious that if for any reason the flow of oil to the filter and back from the filter is blocked, as, for example, if the filter becomes clogged by excessive sediment, the flow of oil through the lubrication system will not be shut off. In such a contingency the pressure in the recess 21 will be applied to the spring pressed disc 43ᵃ of the relief valve shown in Fig. 2 and upon the yielding of the spring the oil will enter the bore 33 and return to the port 23 directly through the bolt, thereby completely by-passing the filter unit.

In the arrangement shown in Fig. 5 the same action will occur by the pressure being applied to the ball 76 to lift it from its seat so that the oil can return as described.

Fig. 13 illustrates another form of by-pass valve which may be employed in place of the valve 41 hereinbefore referred to. This modified valve construction is generally designated 141 and comprises or embodies a passage or bore 138 which is formed through the plate from the top to the under or bottom side and which intersects the radial bore 133. The outer end of the valve bore 138, is shown as screw threaded to receive the threaded nut or plug 142 while the opposite end of this bore which opens through the underside of the plate is of reduced diameter to form a valve disc seat 140 upon which rests the valve disc 143. This disc is maintained yieldingly in position by the coil spring 144 which is interposed between it and the plug 142 as shown.

While the upper end of the bore 138 has been shown and described as screw threaded to receive the threaded plug 142, it is to be understood that the plug may be fixed in the bore in any other suitable manner, as by press fitting it or sweating it in place.

The valve construction generally designated 41 and hereinbefore particularly described is of novel construction in the provision of the recesses 44. The disc 43ᵃ fits relatively snugly in the bore 42 and by the provision of the recesses 44 at opposite sides of the valve disc, when fluid pressure is applied to the underside of the valve disc through the opening in the washer 43', the fluid may pass simultaneously radially in two directions with respect to the valve disc into the recesses 44 and then into the radial bore 33 without causing tipping or cocking of the valve disc.

The centrally apertured washer 43' is dished slightly toward the valve disc 43ᵃ which rests thereon so that the valve disc has an edge contact with the washer around the opening, thereby providing for a more effective seating of the valve in closing under the action of the spring 43ᵇ.

It will be readily apparent that the form of the relief valve shown in Fig. 2 may be used in the construction shown in Fig. 5, if found desirable, in place of the relief valve there shown. Accordingly it is to be understood that the different embodiments of the invention are not limited to use with the types of relief valves with which they are shown but that such valves may be employed in the different embodiments as may be found most convenient or desirable.

I claim:

1. Means for mounting an oil filter on an automotive engine body having in association with a lubrication system a wall provided with a recess into which outflowing lubricating oil is received from the system and a hollow stud in and projecting from the bottom of the recess by which oil returns to the system; said mounting means comprising a substantially flat plate having a top side and an under face and being of a size to cover said recess and having a bolt opening therethrough for alignment with said hollow stud, a bolt for extension through said bolt opening into the hollow stud, the plate having an oil return bore extending therethrough substantially parallel with the plane of the said under face thereof and intersecting the bolt opening, the bolt having a passage through the inner end portion only thereof and connecting the bore with the hollow stud, a body having an end joined to an edge portion of the plate and having means by which there may be coupled therewith a filter unit having an inlet and an outlet, a conduit extending through said body and having an end opening through the said under face of the plate for receiving oil from the recess, said conduit opening at its other end through the other end of the body to discharge into the inlet of an attached filter, said oil return bore having an intake end opening through the body at a location to receive oil from the outlet of an attached filter, and a pressure opened valve means for admitting oil into said oil return bore from the recess over which the plate is secured when in use.

2. The invention according to claim 1, wherein said body constitutes an externally threaded stud rising from the outer side of the plate and directed at an angle outwardly with respect to the center thereof.

3. The invention according to claim 1, with a post rising from the plate and having said body upon the outer end thereof, said body being in the form of an externally threaded stud extending from the post obliquely thereof and outwardly with respect to the plate and said conduit and bore extending through said post to said body.

4. The invention according to claim 3, wherein a port leads from the bore through the under side of the plate in a portion thereof which overlies the recess when the plate is in operative position, and said pressure opened valve comprises a tubular member in said port, a movable valve element in the bore and closing the tubular member at the inner end thereof, and spring means in the bore engaging and yieldingly retaining the valve element in closing position.

5. The invention according to claim 1, wherein said body comprises a stud and means for coupling therewith a filter unit having an externally threaded neck, said last means comprising an internally threaded cup having a bottom opening to receive said stud and a locking nut threaded on the stud and securing the cup thereto.

6. Means for mounting an oil filter comprising a disk plate having a top and bottom side, a bore formed diametrically therethrough and opening at one end through the edge of the plate, a mounting bolt opening formed centrally through the plate and intersecting the bore, an externally threaded stud integral with the top side of the plate and projecting outwardly therefrom at an oblique angle to the plane of said top surface thereof, said bore extending at its other end axially through the stud and opening through the outer end of the stud, the stud having a passage therethrough opening at one end through said outer end of the stud at one side of the extended end of the bore, the passage opening at its other end through the bottom side of the plate, means for closing the said one end of the bore, and a mounting bolt formed to extend through the bolt opening and having an axial passage extending part way only therethrough and formed for communication at one end with the bore and opening at its other end through the end of the bolt.

7. Means for mounting an oil filter comprising a plate having a top and bottom side, a bore forming a fluid passage extending across the width of the plate between said sides and opening at one end through an edge of the plate, means closing said one end, the plate having a mounting bolt opening therethrough intersecting said bore, a post rising from the top side of the plate and adjacent to the edge thereof and having a longitudinal bore communicating at one end with the first bore, a tubular nipple extending from the upper end portion of the post and communicating with the post bore, an internally threaded cup body secured to the upper end portion of the post concentric with the nipple and having the nipple extending axially therein, the cup body being adapted for connection with a threaded neck of a filter, a passage extending longitudinally through the post and opening at one end into the cup and opening at its other end through the bottom side of the plate, and a mounting bolt for extension through said bolt opening and formed to pass fluid from the first bore through the bottom side of the plate.

8. The invention according to claim 7, with a by-pass port leading from the first bore through the bottom side of the plate and a by-pass valve closing said port and openable into the said first bore.

9. Means for mounting an oil filter comprising a plate body having a top and bottom side, a bore extending across the width of the body between said sides, a mounting bolt opening formed through the plate transversely of and intersecting said bore, a stud carried by the body upon the top side and having an outer end, said bore extending at one end through the stud and opening through said outer end thereof, the stud having a passage therethrough opening at one end through the said outer end thereof at one side of the extended end of the bore, the passage opening at its other end through the bottom side of the plate, means for securing a filter unit to said outer end of the stud for communication with the bore and passage, a mounting bolt formed to extend through the bolt opening and having an axial passage formed through a part only of its length and adapted to have communication at one end with the bore and opening at its other end through the end of the bolt, the body having a relief port opening through the underside only into said bore, and a relief valve closing said port and opening into the bore.

10. The invention according to claim 9, wherein said relief valve port defines the lower end of a bore extending across the first bore, the relief valve embodying an apertured washer fitted in the port, a valve disk resting upon the washer and closing the aperture therein and spring means urging said disk against the washer.

11. The invention according to claim 10, wherein the last named bore has the wall on opposite sides of the valve disk formed with longitudinal channels for passage of fluid across the edge of the disk when the disk is raised from its seat on the washer.

12. For use on an engine body having a wall provided with a recess into which outflowing lubricating oil is received and a hollow threaded stud upstanding in the bottom of the recess for returning oil to the engine; a mounting for a filter unit of a type embodying a can having an internally threaded neck, said mounting comprising a plate having an under face and an outer side and being of a size to fully cover and close the recess, the plate having a centrally located bolt opening therethrough for alignment with said stud, an oil passage within and extending across the width of the plate and intersecting and communicating with said bolt opening, a filter unit attaching member integral with the outer side of the plate at an end of said oil passage adjacent to the edge of the plate, said member including a circular externally threaded portion for threaded connection in the neck of a filter unit can, said member further including a terminal nipple extending axially therefrom and a communicating passage joining said end of the oil passage, said member having a passage therethrough opening at one end through said under face of the plate and having its other end open at the outer side of the nipple, and a mounting bolt adapted to be extended through said bolt opening from the outer side of the plate and having a threaded shank adapted for threaded connection in said hollow stud, the bolt having a bore leading from its inner end and terminating short of its outer end in a radial opening located for communication with said oil passage when the mounting bolt is in plate-securing connection with said threaded stud.

13. The invention according to claim 12, wherein the said externally threaded portion is positioned to have its axis directed at an oblique angle to the plane of the plate.

14. The invention according to claim 12, with a relief port opening from said oil passage through the under face of the plate, and a spring pressed relief valve element closing said port and opening toward the oil passage.

15. The invention according to claim 12, wherein said filter unit attaching member further embodies an elongate post between the said circular externally threaded portion and the plate, a relief port opening from the said end of the oil passage through the under face of the plate and aligned with said communicating passage, and a spring pressed relief valve element closing said port and opening toward the oil passage, said valve element spring being housed in said communicating passage.

References Cited in the file of this patent

UNITED STATES PATENTS

| | | |
|---|---|---|
| 1,720,475 | Hewitt | July 9, 1929 |
| 2,203,668 | Burckhalter | June 11, 1940 |
| 2,253,685 | Burckhalter | Aug. 26, 1941 |
| 2,275,481 | Wilkinson | Mar. 10, 1942 |
| 2,633,991 | Beatty | Apr. 7, 1953 |
| 2,704,156 | Botstiber | Mar. 15, 1955 |

FOREIGN PATENTS

| | | |
|---|---|---|
| 577,510 | Great Britain | May 21, 1946 |